G. S. TIFFANY.
TELEGRAPHONE.
APPLICATION FILED MAR. 17, 1909.
1,142,384.
Patented June 8, 1915.
9 SHEETS—SHEET 5.
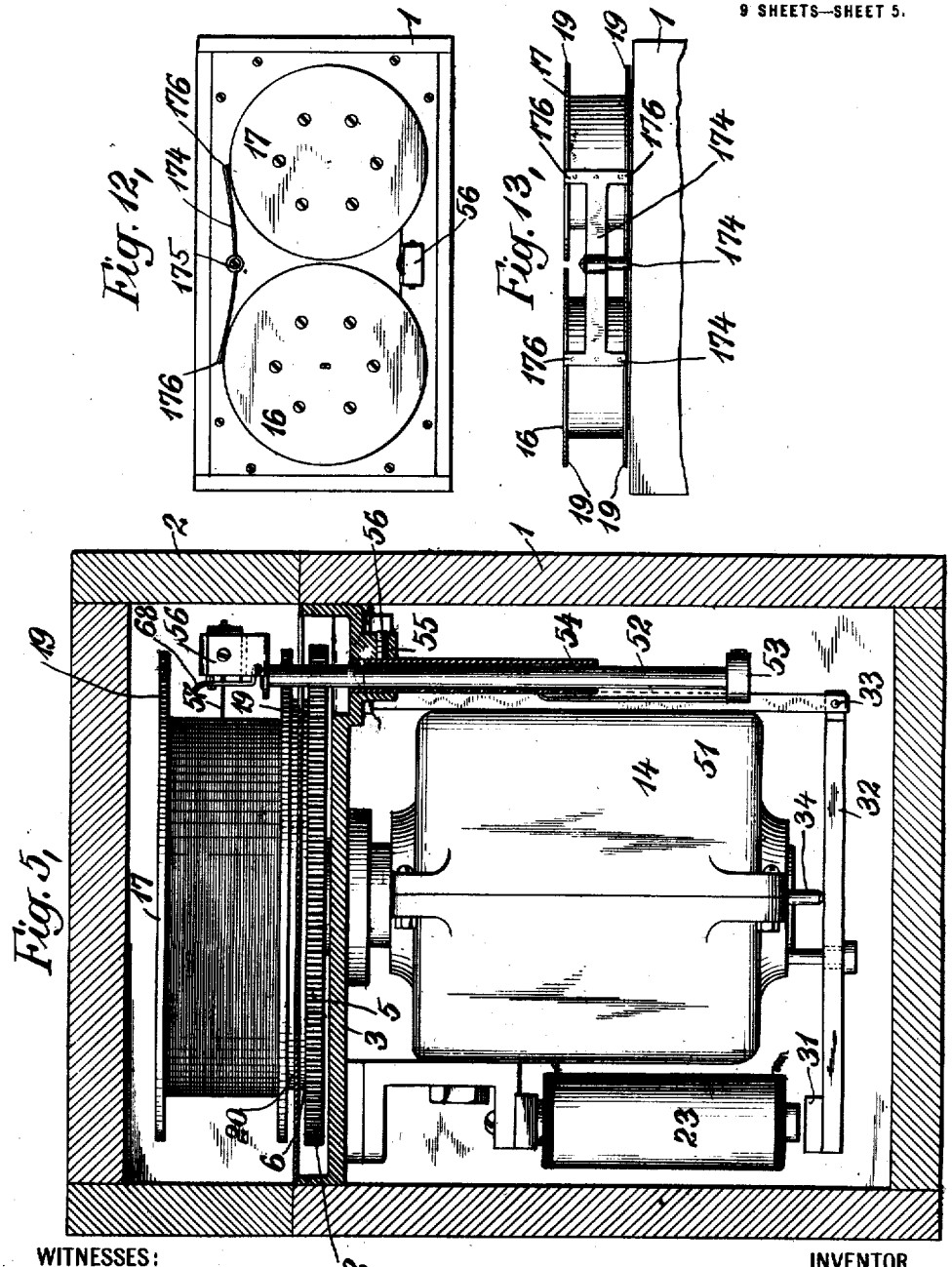
WITNESSES:
INVENTOR
George S. Tiffany
BY
Kenyon & Kenyon
his ATTORNEYS G. S. TIFFANY.
TELEGRAPHONE.
APPLICATION FILED MAR. 17, 1909.
1,142,384.
Patented June 8, 1915.
9 SHEETS—SHEET 6.
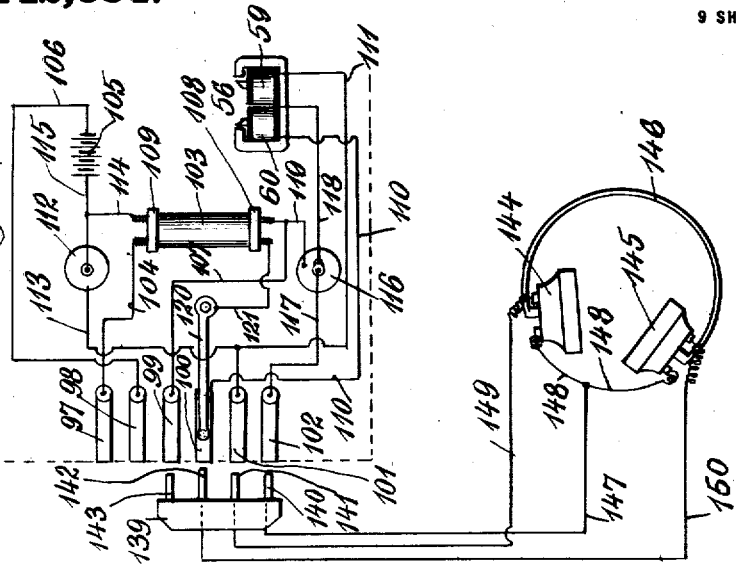
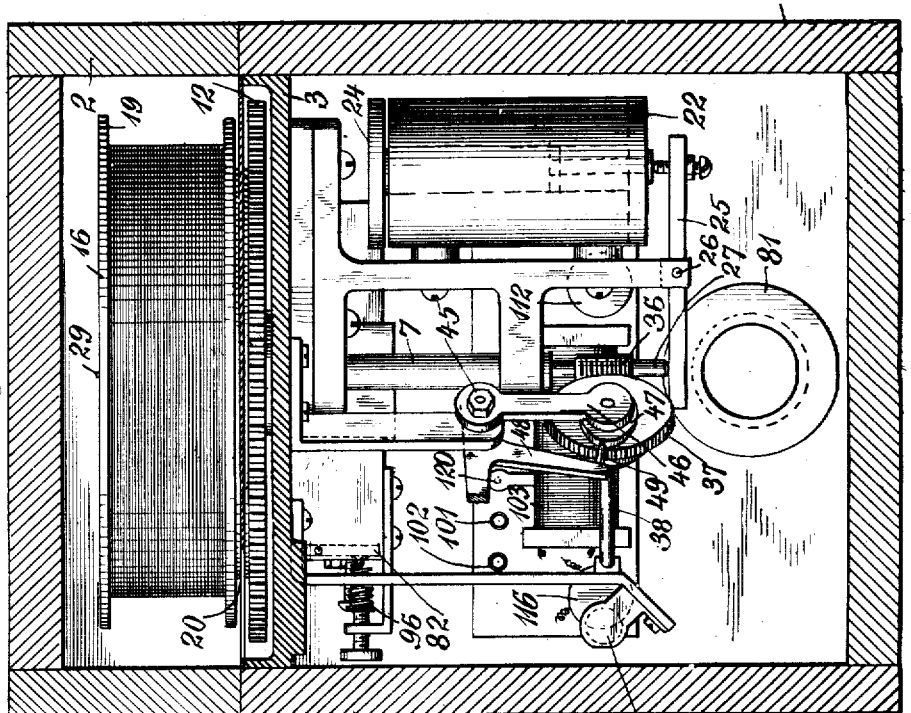
WITNESSES:
INVENTOR
George S. Tiffany
BY
Kenyon & Kenyon
his ATTORNEYS

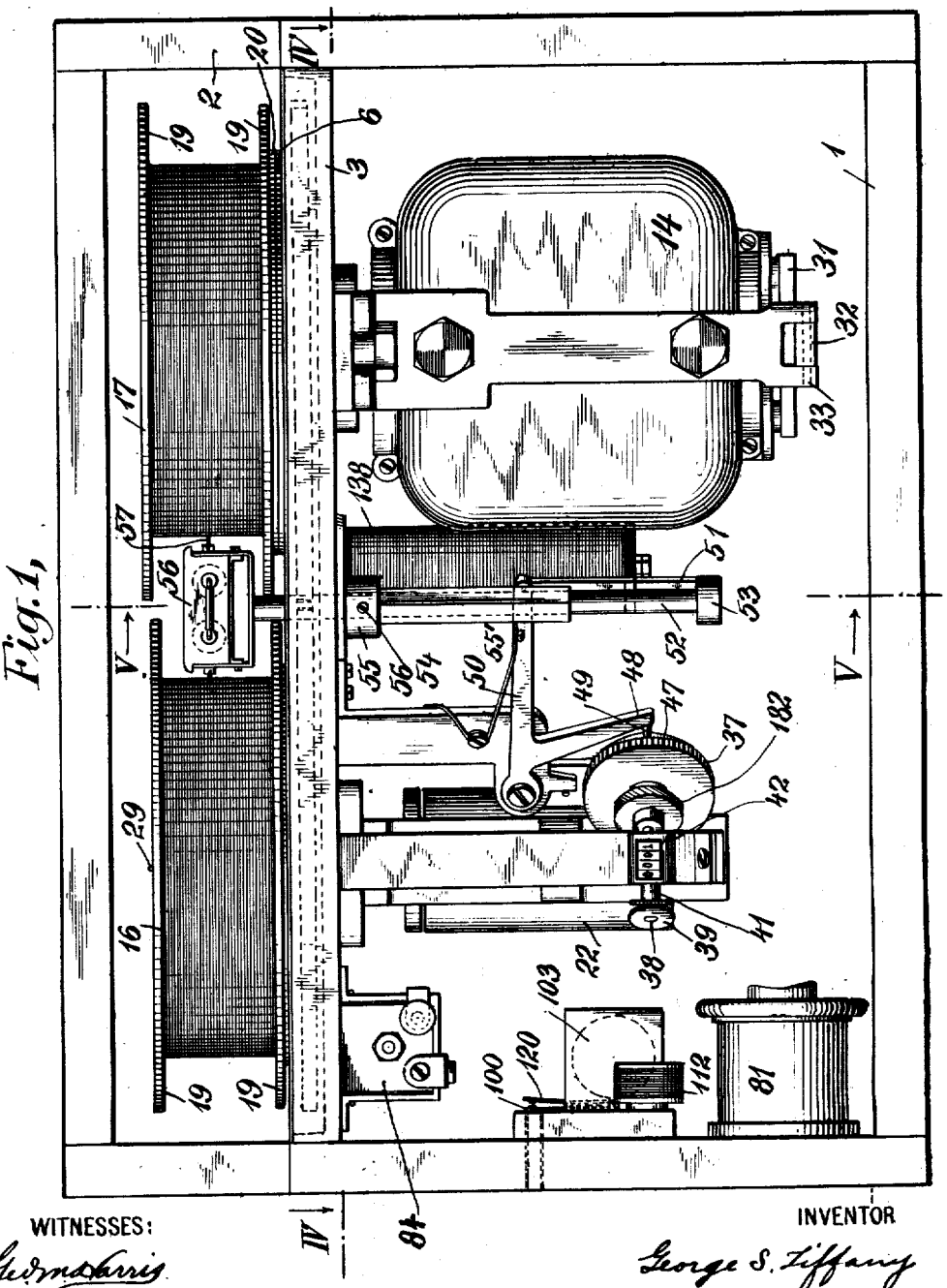

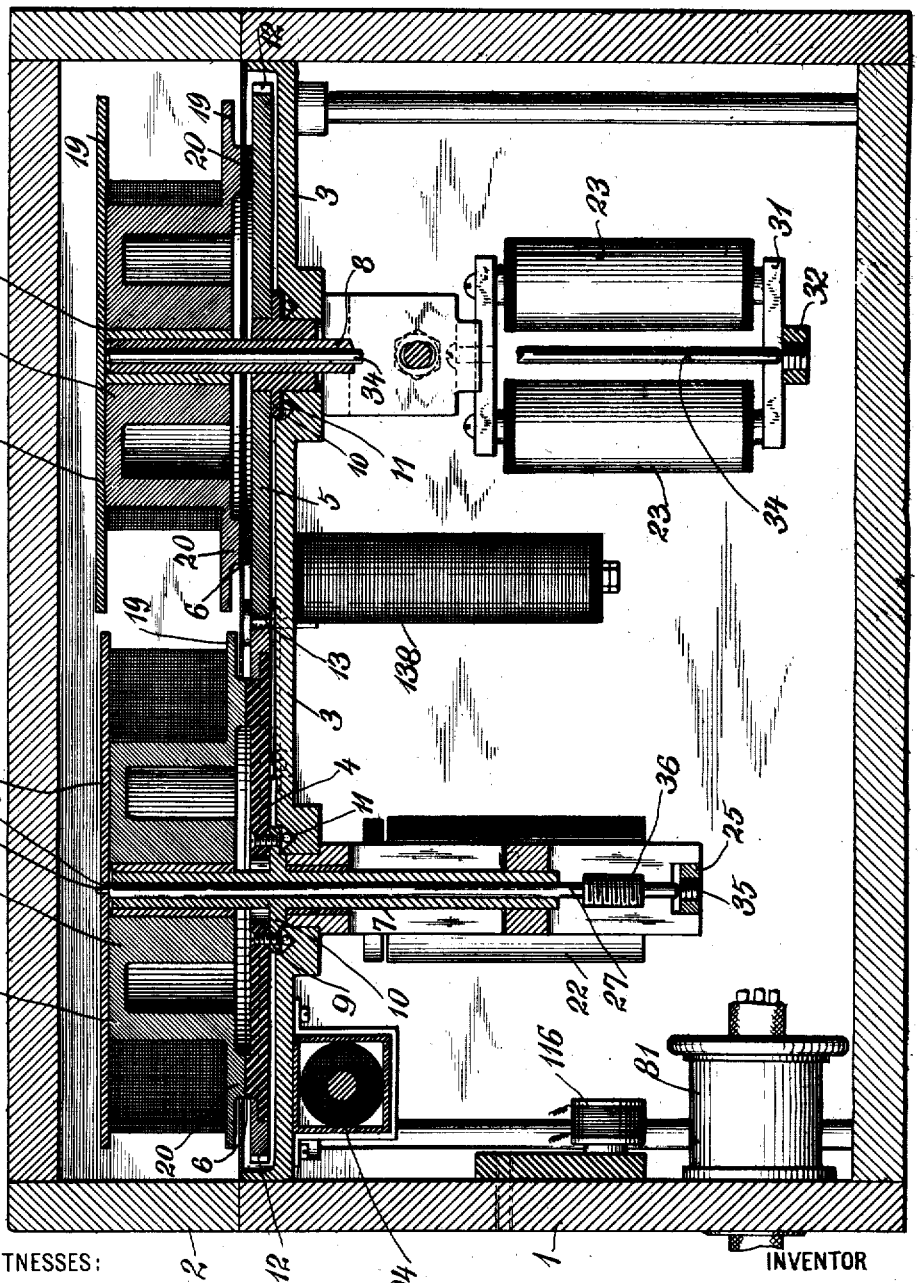

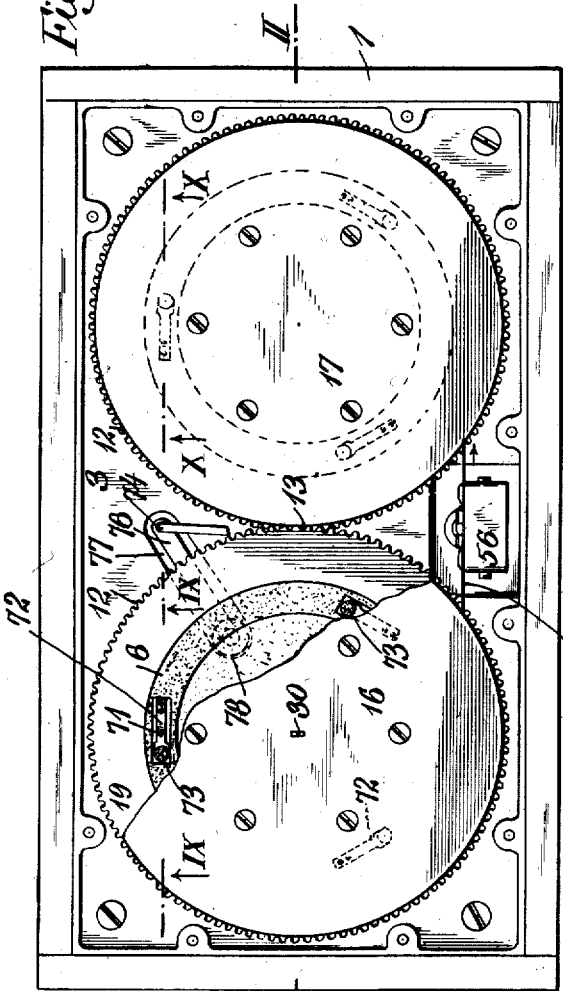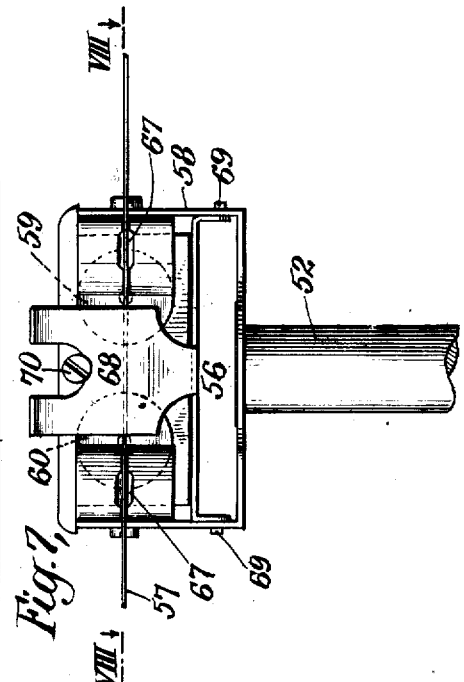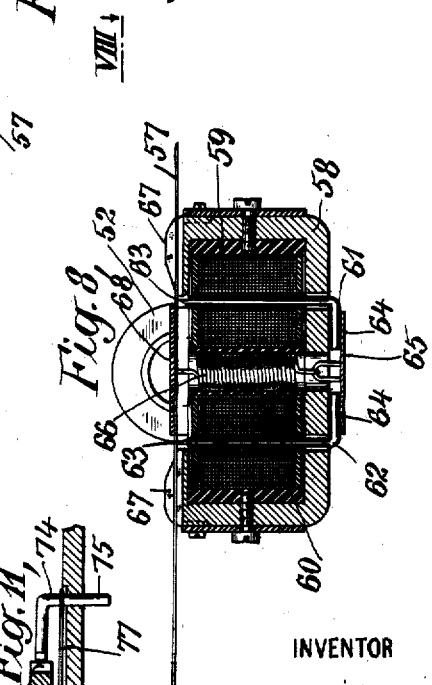

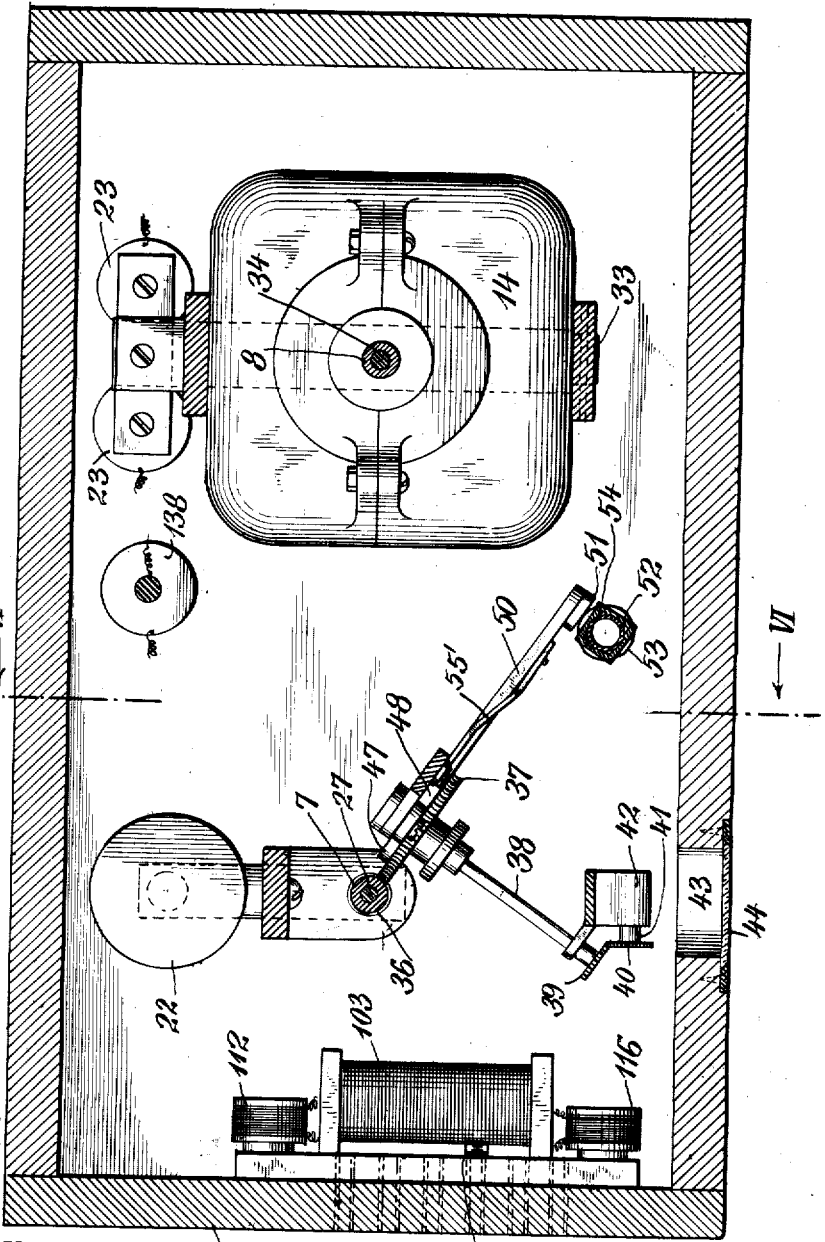

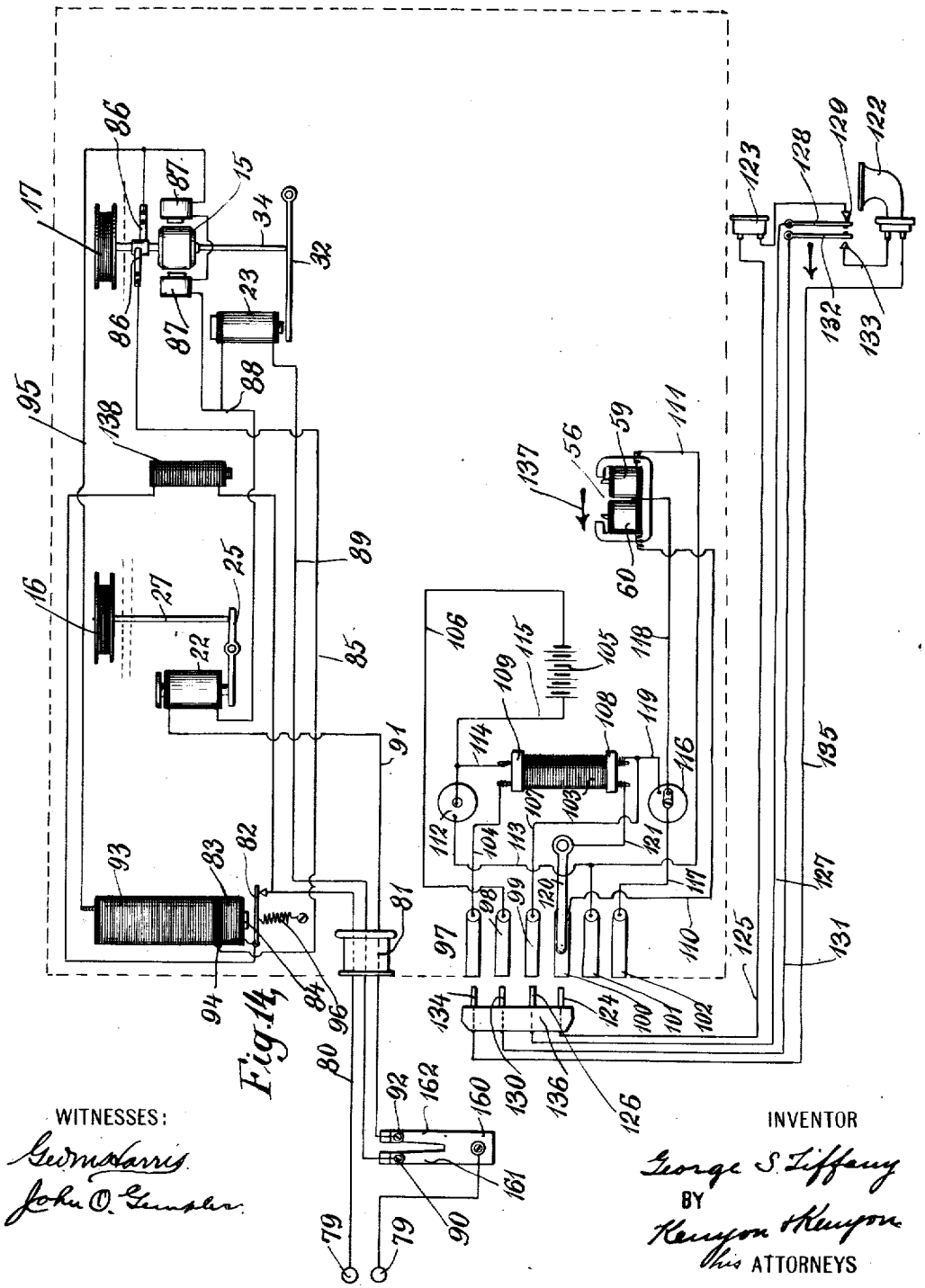

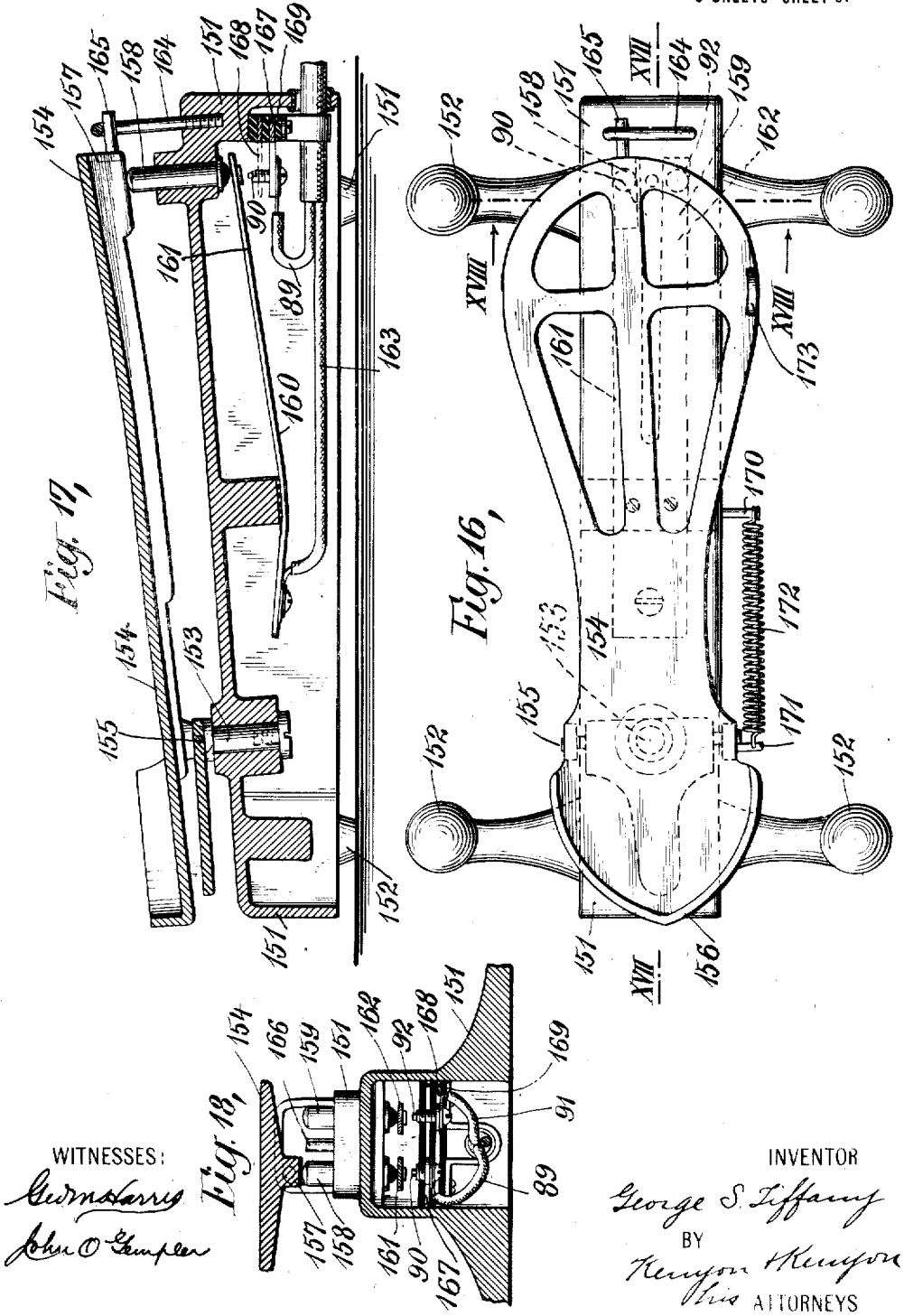

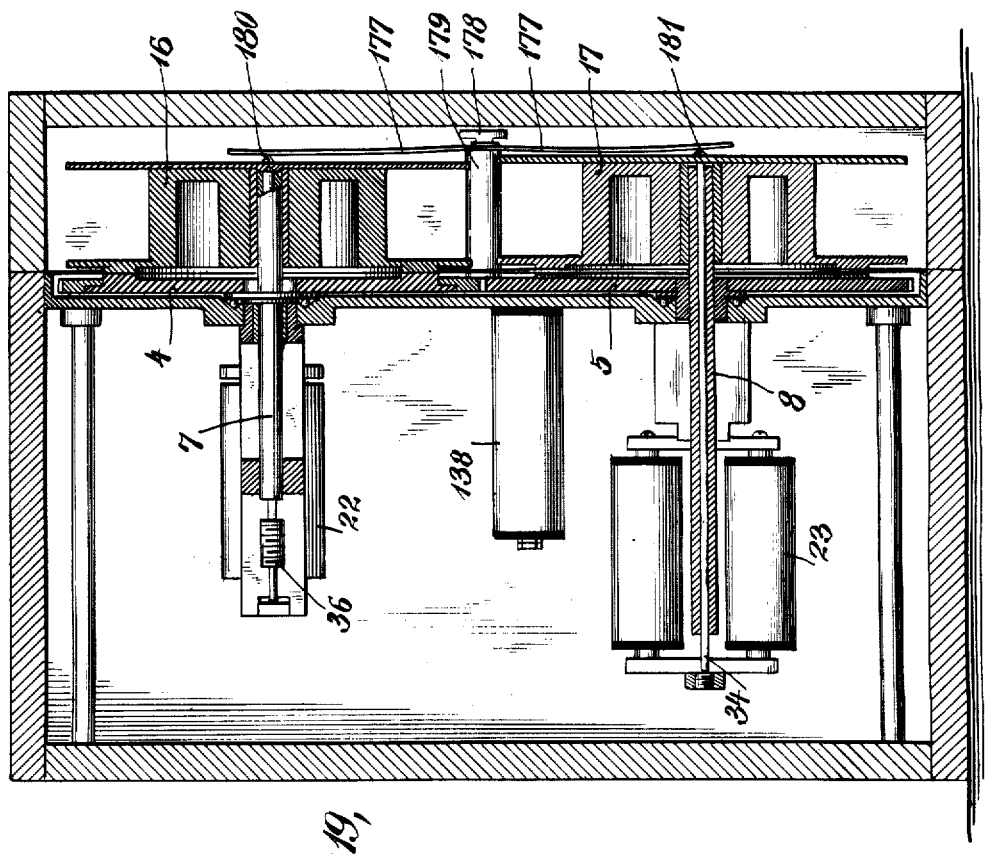

UNITED STATES PATENT OFFICE.

GEORGE S. TIFFANY, OF SUMMIT, NEW JERSEY, ASSIGNOR, BY MESNE ASSIGNMENTS, TO AMERICAN TELEGRAPHONE COMPANY, A CORPORATION OF THE DISTRICT OF COLUMBIA.

TELEGRAPHONE.

1,142,384.  Specification of Letters Patent.  Patented June 8, 1915.

Application filed March 17, 1909. Serial No. 483,879.

*To all whom it may concern:*

Be it known that I, GEORGE S. TIFFANY, a citizen of the United States, and a resident of Summit, Union county, New Jersey, have invented certain new and useful Improvements in Telegraphones, of which the following is a specification.

My invention relates to telegraphones and is designed to provide general improvements upon the apparatus described in United States Letters Patent No. 661,619 issued to V. Poulsen, November 13, 1900.

One object of my invention is to provide an apparatus of the class described in which the driving and braking apparatus for the spools or reels which carry the recording body is greatly improved in that the same is much simpler, more economical in construction and operation and so arranged that the recording body which is wound upon the spools is always kept taut and is prevented from becoming slack when the reels are brought to rest or at any other time, thus preventing said body from becoming broken when a slack portion thereof would be suddenly brought taut when the apparatus is started up.

A further object of my invention is to provide a more convenient and simple means for controlling the apparatus and especially by means of electrical connections which may be controlled by the foot of the operator.

A further object of my invention is to so arrange the electrical circuits in the apparatus and especially in the talking head, that a single coil thereon may carry a current which accomplishes two functions, thus avoiding the use of separate coils for each function whereby the comparative spaces of the windings thereon is greatly decreased.

A further object of my invention is to provide automatic means for regulating the speed of the driving means in the apparatus such that the speed thereof and consequently the speed of the rotating reels or spools is maintained substantially constant.

A further object of my invention is to so arrange the mechanism and apparatus that the talking head may be readily and easily adjusted to any position the recording body may occupy on the spools when new spools are placed in the machine.

A further object of my invention is to so position the reels or spools that a more compact and simpler form of apparatus is obtained and to automatically move the talking head when the machine is in operation, such that it properly guides the recording body over the surfaces of the reels or spools.

These and further objects, advantages and new and useful features will more clearly appear from the detailed description given below taken in connection with the accompanying drawings which form a part of this specification.

In the drawings, Figure 1 is a side view of a machine embodying one form of various of my improvements, the side of the casing being removed in order to show various of the parts therein. Fig. 2 is a sectional view of the same taken on the line II—II of Fig. 3. Fig. 3 is a top plan view of the same machine, the top of the casing being removed to show the various parts therein. Fig. 4 is a sectional plan view taken on the line IV—IV of Fig. 1. Fig. 5 is a sectional view taken on the line V—V of Fig. 1 and looking in the direction of the arrows. Fig. 6 is a vertical sectional view taken on the line V—V of Fig. 1, but looking in the opposite direction from that indicated by the arrows. Fig. 7 is a side view of the talking head used in the machine shown in the previous figures. Fig. 8 is a sectional plan view thereof taken on the line VIII—VIII of Fig. 7. Fig. 9 is a detailed vertical section taken on the line IX—IX of Fig. 3. Fig. 10 is a similar view taken on the line X—X of Fig. 3. Fig. 11 is a detailed vertical section taken substantially on the line IX—IX of Fig. 3, but looking in the opposite direction from that indicated by the arrows. Fig. 12 is a plan view of the machine similar to the view shown in Fig. 3, but showing a modified detail. Fig. 13 is a partial side view of the apparatus shown in Fig. 12. Fig. 14 is a diagrammatical view of the various electrical circuits controlling the apparatus and certain appurtenant mechanism, this view showing the apparatus as being used with a combination telephone receiver and transmitter. Fig. 15 is a diagrammatical view of the talking circuits showing the same in connection with a double receiver. Fig. 16 is a plan view of the controlling switch mechanism which is adapted to be controlled by the foot of the operator. Fig. 17 is a vertical section thereof taken on the line XVII—XVII of Fig. 16. Fig. 18 is a transverse section thereof taken on the line XVIII—XVIII of Fig. 16. Fig. 19 is a sectional view of a modified form of apparatus showing the reels or spools arranged in a vertical position.

Referring to the various figures, and especially to Figs. 1, 2, 3, 4, 5 and 6, 1 represents a casing provided with a cover 2 which may be secured to the same in any convenient manner. Within the casing 1 there is provided a transverse shelf 3 forming part of a suitable framework. Upon the shelf 3 there are arranged two rotatable disks 4 and 5 each provided with a raised portion 6 made of suitable friction material and arranged in a circular track about the center of rotation of the disks 4 and 5. The disks 4 and 5 are also provided with hollow shafts 7 and 8 respectively, secured thereto by means of screws 9, each shaft having a circular bearing piece 10 secured to or made integral therewith, underneath which there are arranged ball bearings 11. Each of the rotating members or disks 4 and 5 is provided at its periphery with teeth 12 and the teeth of each disk engage each other at the point 13, so that when one of said disks is driven the other must necessarily follow and rotate in the opposite direction. The hollow shaft 8 is mechanically connected to be driven by a series motor included within a casing 14, which motor may be designated by reference numeral 15. Preferably the shaft 8 is directly connected to and in line with the armature of the motor 15. From the above it will be apparent that whenever the motor 15 is operated it will rotate the shaft 8 and consequently the member or gear 5, which will in turn rotate the member or gear 4 by engagement therewith.

Located directly above the members 4 and 5 are spools or reels 16 and 17 respectively. Each spool is provided with a core 18 and circular flange pieces 19. The lower circular flange pieces or extensions 19 are arranged with raised circular tracks 20 arranged to frictionally engage with the circular tracks 6. The reels or spools 16 and 17 are arranged to rotate freely about the hollow shafts 7 and 8 and are provided with bearing boxes 21 for this purpose. Means are provided which will be hereafter described for raising either one or the other of the reels or spools 16 and 17 substantially out of engagement with the rotating members 4 or 5, such that when the motor is rotated both of the disks 4 and 5 will be rotated, but only the spool which is in thorough frictional engagement with one of the rotating disks 4 or 5 will be rotated.

As shown in Fig. 2, the spool 17 is shown slightly raised, so that the circular tracks 6 and 20 adjacent thereto are substantially out of engagement with each other, thus allowing the member 4 to drive the reel 16 by means of the frictional engagement of tracks 6 and 20 adjacent thereto, and so that the reel 17 will follow, provided a wire or other recording body is being wound upon the reel 16 and unwound from the reel 17.

In order to provide suitable means for slightly raising either one or the other of the reels 16 or 17 so that it will be substantially out of frictional engagement with its driving member 4 or 5 I provide electromagnets 22 and 23, the magnet 22 operating upon a solenoidal core 24 to pull the same downwardly, which in turn operates a lever 25 pivoted at 26 to raise a pin 27 which loosely extends through the hollow shaft 7. The pin 27 is provided with a shoulder 28 at its upper extremity, which shoulder engages the under face of the top extension piece 19 of reel 16, so that when the pin 27 is raised the reel 16 is slightly raised so that it is substantially out of frictional engagement with its driving member 4. Adjacent to the shoulder 28 the pin 27 is provided with a rectangular extension 29 fitting a rectangular slot 30 in the top circular extension 19 of reel 16. This is so that the rotation of reel 16 will cause the simultaneous rotation of the pin 27.

Somewhat similarly the magnets 23 are arranged to attract an armature 31 to operate a lever 32 pivoted at 33 so that it will raise a pin 34 extending through the armature of motor 15 through the hollow shaft 8 up to the underneath side of the circular extension or cap piece 19 of the reel 17, so that when the magnets 23 are energized the core 31 will be attracted and the lever 32 operated to raise the pin 34 and thus raise the reel 17 slightly so that it will be substantially out of frictional engagement with its driving member 5. Each of the levers 25 and 32 is provided with a piece of suitable bearing metal 35 screwed thereinto beneath the pins 27 and 34 respectively, in order to provide for wear.

Fixedly secured to the rotating rod or pin 27 is a worm 36 arranged to engage and drive a worm wheel 37 which in turn drives a shaft 38 having at its other end a pinion 39. The pinion 39 drives a pinion 40 on shaft 41 which operates the mechanism of a cyclometer or similar arrangement 42 which indicates the number of revolutions of the reel 16 thereby indicating approximately the amount of the recording body which has been wound by either one or the other of the reels 16 or 17. The cyclometer 42 may be of any convenient or well known form and there is provided an aperture 43 within the casing of the apparatus through which the cyclometer may be visionally read. A glass 44 may be provided to cover the aperture 43 to prevent the entrance of dirt or dust into the apparatus, (see Figs. 1, 4 and 6).

The worm gear 37 and its shaft 38 is pivotally hung to the framework at 45, (see Fig. 6) by means of a link 46, the lower end of the link 46 being provided with a bearing for the shaft 38. Rigidly secured to the inner face of the worm gear 37 is a heart-shaped cam 47 which operates an arm 48 which has an extension 49 which engages the cam surface of the cam 47. The arm 48 is pivotally mounted concentrically with the link 46 and is provided with an extension 50 carrying at its outer end a pivotally mounted link 51, the link 51 being pivotally mounted at its lower end to a hollow rod 52, the rod 52 being enlarged at its lower end, as shown at 53. The rod 52 extends upwardly through a hollow square guiding member 54 which is secured to the framework by means of a bushing 55 and screw 56. The bearing member 54 is made substantially square on its inner side in order that spaces may be left between it and the circular rod 52, so that dust and dirt which would otherwise collect therein will readily fall through the hollow member 54. A spring 55' is provided to always tend to force the arm 48 with its extension 49 in engagement with the heart-shaped cam 47 and to tend to maintain the rod 52 in its lowermost position.

At the upper end of the hollow rod or shaft 52 is located the talking head 56. The talking head 56, (see Figs. 3, 7 and 8) is arranged to have the recording body 57, which in the present instance consists of a small steel wire, pass adjacent thereto in order to have the desired records produced thereupon or reproduced therefrom. It consists primarily of a frame 58 carrying two electro-magnetic coils 59 and 60 respectively. The cores of these coils 61 and 62 are made of slender rods pointed at their inner ends as shown at 63 adjacent the recording body or wire 57. At their opposite ends they are bent as shown at 64 to engage a U-shaped member 65, the member 65 tending to force the cores inwardly toward the recording member 57 by means of a spring 66 and retaining them in proper position. In order to hold the recording body properly in place the material of the framework forming the magnetic path for the magnets 59 and 60 is slotted opposite the center of each magnet as shown at 67. The wire 57 passes through these slots and is held therein and properly and resiliently against the cores 61 and 62 by means of a pivoted member 68 pivoted to the frame 58 at 69 and arranged to be held firmly in position by being snapped under the head of a screw 70. When it is desired to separate the head from the recording body it is only necessary to unsnap the member 68 from the screw 70 by a slight downward pressure and to oscillate the member 68 downwardly, whereby the wire 57 may be readily slipped out of the slot 67 and easily removed.

Referring to Figs. 3, 9 and 10 I show, (especially in the latter two figures in detail) means for braking the spools or reels both when in motion and when it is desired to bring the same to a state of rest. Referring to Fig. 9, I show the manner in which the reel 16 is driven by a rotating disk or member 4. The weight of the reel or spool is such that when released by the lowering of the rod 27 the entire contact surfaces of tracks 20 and 6 are brought together so that the reel 16 will be driven from the shaft 7 and both will rotate in the same direction and the reel 16 will act as the driven reel. Under these conditions the reel 17 will be raised so that it will be substantially frictionally disengaged from its driving member and will act as a following reel, the wire 57 being unwound therefrom and wound upon the reel 16. In each of the circular track raised portions 6 I provide recesses 71 in each of which is firmly secured at one end a resilient or spring member 72 which carries at its other end a block of friction material 73, such as rubber or other suitable substance. I provide each track portion 6 with three of these recesses and resilient members substantially distributed at equidistant points about the same. The members 72 are constructed to resiliently force the material 73 against the track portions 20 of the reels 16 and 17, thus when the reel is slightly raised, as is shown in connection with reel 17, although the friction surfaces on these raised portions are disengaged from one another nevertheless the material 73 still acts frictionally against the raised portion 20. With the reels, as shown in Figs. 2 and 3, the reel 17 being slightly raised and the reel 16 being dropped, the frictional torque between the portions 6 and 20 at reel 16 is much greater than the frictional torque between the members 6 and 20 at reel 17. Therefore, member 4 will drive reel 16 while the member 5 with the rubbers 73 will act as a movable rotating brake tending to move the reel 17 in the opposite direction from which it is being pulled, thus acting so that the wire 57 is always kept taut while the reels are being driven. The drags or members 72, 73 may be located on the outer part of members 4 and 5 if desired or in any other convenient position. If located outside of the raised portions 6 it will be unnecessary to place them in recesses. It is understood that the reel 17 may be dropped so that it will act on the driven reel while reel 16 may be raised so that it will act on the following reel, the rubbers 73 thereat acting as brakes to the same. The mechanism and arrangements by which either one or the other of these reels may be thus operated will be more fully described hereafter.

While the reels are coming to rest after the power has been shut off there might be a tendency for the driven reel (reel 16 in this case) to rotate to a slight extent in the opposite direction from which it is being driven, this being caused by the dragging pull of the following reel. In order to prevent this and thus prevent any slack from occurring in the wire 57 between the reels I provide a pawl member 74 pivotally mounted in an aperture through the shelf 3 by means of a bent portion 75. Fixedly secured to the pawl member 74 is a spring member 76 located in a recess 77 in the shelf 3. The member 76 is provided with a frictional contact head 78 at its opposite end which is arranged to always frictionally engage the underneath side of the driving member 4 of reel 16. It will be noted that the motor is arranged to rotate always in the same direction and, therefore, the driving members 4 and 5 always rotate in the same direction. When rotating in this direction the member 4 by its frictional contact with the head 78 tends to rotate the pawl out of engagement with the teeth 12 of the member 4 which act as a ratchet means therefor. If it should be attempted to turn either of the driving members 4 or 5 in the opposite direction the member 4, by its frictional contact with the head 78, will rotate the pawl 74 into engagement with the teeth 12 of member 4 and thus prevent any backward rotation. By thus preventing any backward rotation and providing the rubbers 73, which act as movable brakes on the following reel, the braking action of which varies as the speed of the reels, the wire 57 is always kept taut and any slack therein is effectively prevented.

Referring to Fig. 14 the arrangement of electrical circuits and appurtenant mechanism is diagrammatically shown whereby I control various parts of the operation of the device. The motor 15 and electromagnets 22 and 23 are supplied from any suitable source of electrical energy, which may be connected at the points 79. From one of the points 79 a conductor 80 leads through a suitable bushing 81 in the casing of a box to the switch member 82, thence through coil 83 on the electromagnet 84, thence through conductor 85 to the brushes 86 and armature of the motor 15, thence in series through the fields 87 of the motor to the point 88. At this point the circuit may return either through the magnet 23, conductor 89, switch contacts 90 or through magnet 22, conductor 91 and switch contacts 92, depending upon whether the circuit through switch contacts 90 is closed or the circuit through switch contacts 92 is closed. The apparatus controlling the switch contacts 90 and 92 will be more clearly described hereafter and is arranged so that only one set of contacts 90 or 92 will be closed at the same time. If the contacts at 90 are closed the magnet 23 is operated, thus slightly raising the reel 17, so that the reel 16 acts as the driven reel and the reel 17 acts as the following reel. In case the contacts 92 are closed the magnet 22 is energized, thus raising the reel 16, whereby it acts as the following reel and the reel 17 acts as the driven reel and the recording body 57 is moved in the opposite direction. In either case the motor 15 rotates in the same direction. On electromagnet 84 I provide a high resistance coil 93 which is connected at the point 94 to one side of the armature of the motor 15 by conductor 85 and its other terminal is connected to the other side of the armature of motor 15 by conductor 95. Thus the coil 93 is in shunt with the armature of the motor 15 and its strength varies in accordance with the voltage thereacross. From the connection shown it will be noted that the coil 83 is a low resistance winding in series with the armature of the motor.

When the motor is running at its normal predetermined speed the resultant effect of opposing coils 93 and 83 is equal but opposite in direction to the effect of spring 96, so that the switch 82 closes the motor circuit. If the speed of the motor 15 should for any reason increase the strength of the counter-electromotive force produced in the motor armature will increase thereby decreasing the strength of the current in the low resistance winding 83 and increasing the current in the high resistance shunt winding 93, so that the effect of the coils and the spring is unbalanced and the electromagnet 84 operates the switch 82 to break the circuit 85, etc., through the motor, so that the supply of energy is cut off therefrom. Immediately, however, the energy is cut off the coils 83 and 93 return to their original condition so that the switch 82 is again closed. This operation is continually repeated as long as there is any tendency for the motor 15 to overspeed and the speed of the motor is thereby kept substantially constant. A high resistance coil 138 is placed in shunt to the switch 82 in order to prevent sparking between the contacts thereof.

Referring to the lower part of Fig. 14 I show six terminals which are located at the side of the box or casing containing the apparatus, which terminals are represented by the numerals 97, 98, 99, 100, 101 and 102.

Contact 97 is directly connected with one side of the primary of an induction coil 103 by means of a conductor 104. Contact 98 is directly connected with one side of a battery 105 by means of conductor 106. Contact 99 is directly connected to one terminal of the secondary of the transformer 103 by conductor 107. The secondary end of transformer 103 I have indicated by 108 and the primary by 109. Contact 100 is directly connected to the outer end of coil 60 on the talking head 57 by means of conductor 110. Contact 101 is connected to the outer end of coil 59 of the talking head 56 by means of conductor 111. This contact 101 is also connected to one side of a high resistance coil 112 by means of a conductor 113. The other side of the high resistance coil 112 is connected to the other side of the primary 109 of the induction coil 103 by means of a conductor 114 and is also connected to the other side of the battery 105 by means of a conductor 115. The contact 102 is directly connected to the resistance coil 116 by conductor 117 and is also directly connected to the inner ends of both of the coils 59 and 60 of the talking head 56 by means of a conductor 118. The other side of the resistance coil 116 is connected to the contact 99 and to a secondary of the transformer 103 by means of a conductor 119. The other side of the secondary 108 of induction coil or transformer 103 is connected to a contact switch 120 by means of conductor 121. Normally the contact switch 120 is arranged to electrically connect the conductors 121 and 110 through the contact 100. As shown in this figure the apparatus is arranged with what I term a combination talking and listening set including a transmitter 122 and a receiver 123 both of which may be similar to the common telephone type. One side of the receiver 123 is connected to a contact 124 by conductor 125. The other side of the receiver 123 is arranged to be connected to a contact 126 by means of conductor 127, switch member 128 and contact 129. One side of the transmitter is arranged to be connected to the contact 130 by means of conductor 131, switch member 132 and contact 133. The other side of the transmitter is arranged to be connected with contact 134 by means of conductor 135. The contacts 124, 126, 130 and 134 are arranged on an insulating bridge piece 136 and are arranged to be placed in electrical contact with contacts 100, 99, 98 and 97 respectively. The switch members 128 and 132 are so arranged that normally the switch member 128 engages contact 129 and is held there by any convenient resilient means. By pressing the switch member 128 in the direction shown by the arrow the contact is broken between member 128 and contact 129 and electrical contact is made between the members 128 and 132 and also between the member 132 and contact 133.

In operation when it is desired to make a record upon the wire 57 the switch member 128 is forced in the direction of the arrow as above described, thus throwing in the transmitter 122 across the contacts 97 and 98. This throws the transmitter in a circuit through conductor 106, battery 105, conductor 115, conductor 114, primary of the transformer 103 conductor 104 back to the other side of the transmitter. Current undulations corresponding to the sound variations transmitted are produced in the secondary circuit which is connected with the recording electromagnetic coil 60 of the talking head 56 as follows. From the secondary 108 through conductor 121, member 120, conductor 110, coil 60, conductor 118, resistance coil 116, conductor 119 to the opposite side of the secondary. In the arrangement as shown the wire 57 would pass in a direction shown by the arrow 137. In this case the coil 59 is used as an obliterating magnet. For this purpose the coil 59 is connected across the battery as follows. Coil 59, conductor 111, conductor 113, coil 112, conductor 115, battery 105, conductor 106, contact 98, conductor 131, member 132, member 128, conductor 127, contact 126, contact 99, conductor 107, conductor 119, coil 116, conductor 118 back to the other side of coil 59. For the purpose of bringing the wire back to a normal condition after being demagnetized by the coil 59 the electromagnet coil 60 is also connected across the battery in the proper direction to cause it to magnetically act on the wire 57 to bring it to a substantially normal state of saturation. For this purpose the coil 60 is connected across the battery in shunt with the coil 116 by means of the conductor 110, contact 100, member 120, conductor 121, secondary of induction coil, conductor 107, contacts 99 and 126, conductor 127, members 128 and 132, conductor 131, contacts 130 and 98 and conductor 106 to the opposite side of the battery. It will thus be apparent that the single coil 60 carries a single current which is composed of two components, one of which is supplied by the battery 105 to magnetically act on the wire 57 to bring it to a substantially neutral state and the other component of which is superposed upon this current by means of the secondary 108, whereby the proper record is made upon the wire 57. The resistance coils 112 and 116 are placed in circuit to adjust the proper amount of current for the various circuits and also to adjust the proportionate amount of current between the various circuits.

Referring to Fig. 15 I diagrammatically show how I preferably connect up a double receiver to the recording and reproducing apparatus. In this case I provide an insulating block 189 provided with contacts 130

140, 141 and 142. A contact 143 may be provided but is not necessary. The contact 142 is arranged to connect with contact 100 and at the same time is made longer so that it will extend therethrough and disconnect the member 120 from the contact 100, so that the circuit through conductor 121, contact 120, conductor 110 will be broken. This disconnects the secondary 108 of the transformer from all other circuits. The double receivers are indicated at 144 and 145 connected by a resilient frame piece 146. One terminal of each receiver is connected to a conductor 147 by means of conductors 148 and the conductor 147 is connected to the contact 140. The other terminal of receiver 144 is connected to the contact 141 by means of conductor 149 and the other terminal of receiver 145 is connected to contact 142 by means of conductor 150. Thus the receiver 144 is connected across the coil 59 as follows: Receiver 144, conductor 149, contact 141, contact 101, conductor 111, coil 59, conductors 118 and 117, contacts 102 and 140, conductor 147 back to the other side of receiver 144. And the receiver 145 is connected across coil 60 as follows: Receiver 145, conductor 150, contacts 142 and 100, conductor 110, coil 60, conductors 118 and 117, contacts 102 and 140, conductor 147, back to the opposite side of receiver 145. Therefore, when these connections are thrown in both of the coils 59 and 60 act as receiving coils so that the reproducing effect is much more effective, being approximately twice as great as that when only one receiver is used and connected as shown in Fig. 14.

Referring to Figs. 16, 17 and 18 I show the apparatus which I preferably used to operate the contacts 90 and 92 shown in Fig. 14. The device consists of a base or frame 151 arranged to rest upon the floor by means of legs 152. Arranged to oscillate in a nearly horizontal plane is a pin 153 having a foot frame 154 pivoted thereto in a longitudinal plane at 155. The foot frame 154 is flanged at its lower and rear end as at 156 in order to provide means for holding the heel of the shoe in position thereon. The front end of the foot frame 154 is provided with a downwardly extending portion 157 arranged to engage either one or the other of the sliding rods 158 or 159. Within the framework 151 there is provided a resilient member 160 secured thereto and provided with two resilient prongs 161 and 162, (these are also shown in Fig. 14), the member 160 being electrically connected to one of the terminals 79 by a conductor 163. Directly underneath each of the sliding rods 158 and 159 are contacts 90 and 92, these contacts being connected respectively to the conductors 89 and 91. A U-shaped wire frame piece 164 is provided on the front end of the wire 151 and arranged to guide the foot frame 154 in the proper longitudinal direction by means of a pin 165 securely fixed to said foot frame 154. A pin 166 is placed between the sliding members 158 and 159 in order to prevent the portion 157 from being forced down between said sliding rods or members. The pin 166 is rigidly secured to the framework 151.

The contacts 90 and 92 may be secured to strips 167 and 168 respectively, which in turn are secured in insulating material 169 made fast to the frame. Extending from the side of the frame 151 is a pin 170 and extending from the side of the frame 154, substantially opposite the pivotal pin 153, is a pin 171. A spiral spring 172 connects the pins 171 and 170, and therefore, tends to force the foot frame 154 to the left as shown in Fig. 16. In this position, if pressed down, the contacts 90 will be engaged by a resilient portion 161, whereby the circuit between 79 and through conductor 89 will be closed. When it is desired to close the connection between contact 92 and resilient portion 162 thereby closing the circuit between 79 and through conductor 91 the foot frame 154 is moved to the right and then forced downwardly. For this purpose a lug 173 is provided on the right hand side of the foot frame near the front thereof, which may be engaged by the front part of the foot of the operator and forced toward the right hand. It will, therefore, be apparent that all of the operating circuits may be conveniently controlled by means of two movements of the foot of the operator, that the reels may be properly set in operation in one direction by the pressing of the foot at one point and may be readily set in operation in the other direction by the pressing of the foot at another point.

Referring to Figs. 12 and 13 I show means for braking the reels 16 and 17 without providing any rubbers 73 upon the driving members. In place of these I provide a resilient member 174 secured to the frame by means of a pin 175 and provided with four arms 176, two of which engage the edges 19 of reel 16 and two of which engage the edges 19 of reel 17, the member 174 being resilient and the arms 176 carrying suitable friction material at their ends where they engage the edges or members 19, these parts serve as brakes for both reels. I do not, however, prefer this form since in general the dragging action of each reel will be the same whatever their direction, and I preferably use the form above described, including the rotating rubbers 73, since much advantage is thereby gained because the following spool is dragged much harder than the driving spool when the spools are being brought to rest.

Referring to Fig. 19 I show an arrangement in which the reels 16 and 17 are arranged in a vertical, rather than in a horizontal, position, as shown in Fig. 2.

As shown in Fig. 2 the portions 6 and 20 act as friction clutches between the driving members and reels, which clutches are operated by gravity. In the arrangement shown in Fig. 19, however, the parts are not so arranged that the action of gravity would operate these parts as friction clutches. In order, therefore, to force the reels 16 and 17 into frictional engagement with the driving members 4 or 5 I provide a resilient strip 177 secured near its center by means of a thumb screw 178 to a post 179. The ends of the resilient or spring member 177 are arranged to bear upon bearing points 180 and 181 respectively of the spools 16 and 17, thus tending to force the spools 16 and 17 into frictional engagement with either one or the other of the driving members 4 or 5. Otherwise the apparatus acts as already described in connection with the other figures.

By arranging the reels with their axes up and down or in a substantially vertical position the arrangement is much more satisfactory. Not only am I enabled to do away with spring pressures and use gravity as the means whereby the driving members and reels are mechanically connected, but the wear and tear is much less and occurs on the parts in such a manner that it is immaterial. The arrangement whereby the braking means is rotating is important, in that the braking action varies in accordance with the speed of the reels as desired. Furthermore the provision of the parts 76, 77 and 78, which prevent the backward rotation of the driving members is important. By preventing or locking these members against any backward rotation the braking means are given their full effect and it is impossible for any slack in the recording body to occur due to the movement of the driven reel.

From the above it will be apparent that I have provided many new and useful improvements in the arrangement and construction and operation of apparatus of the class described, and especially by providing an arrangement in which the reels or spools carrying the recording body may be placed in a horizontal position and may be driven by friction clutches operated by gravity and thrown out of operation by electromagnetic means. It will further be apparent that I have provided an exceptionally effective and advantageous means for dragging the spools whether running in one direction or the other, whereby all slack in the wire is prevented and the wire is kept taut at all times whether running or at rest or whether being started or being brought to rest. Many other detailed improvements will be apparent from the above description, including the arrangement for regulating the speed of the motor, the connections and arrangement whereby the operation of the machine may be controlled by the foot of the operator, the automatic adjustability of the talking head so that it guides the wire over the surface of the spools in the proper manner and the construction of the talking head which allows of a current to be used in a single coil which accomplishes two functions and also in the peculiar arrangement of the talking head which allows of the easy opening thereof to remove the recording body or wire. It will further be apparent that since the worm gear 37 is pivotally hung by means of link 46 that the same may be easily pulled away from its driving worm 36 and the cam 47 turned around by means of the thumb head 182, so that when new spools or reels are put onto the machine the talking head 56 may be adjusted to the position of the wire 57 thereon. No matter in what position that wire may happen to be the cam 47 may be thus turned around until the talking head is raised to that position by means of the arms and levers above described.

Further features and detailed improvements will be apparent from the above description and also from the claims hereinafter given.

Although I have described my improvements in great detail and with respect to a particular apparatus embodying one form of my invention I do not desire to be limited to such details, but Having fully and clearly described the same what I claim as new and desire to secure by Letters Patent, is:

1. The combination of a recording body, two reels from and on which said body is arranged to be unwound and wound, means for driving one of said reels, friction means on the other reel and rotating friction means for engaging said first mentioned friction means to brake said other reel.

2. The combination of a recording body, two reels from and on which said body is arranged to be unwound and wound, means for driving one of said reels, means for braking the other reel and for causing said braking action to vary as the speed of the reels.

3. The combination of a recording body, two reels from and on which said body is arranged to be unwound and wound, means for driving one of said reels and rotating means for braking the other reel, so arranged that the braking action varies as the speed of the reels.

4. The combination of two rotatable members, two reels arranged to frictionally engage said members when said members are at rest and means for substantially removing one of said reels from frictional engagement with its member when either of said members is rotated, so that the other member will drive the other reel.

5. The combination of two rotatable members, two reels, a recording body arranged to be wound upon said reels, said reels being arranged to be driven by said members by frictional contact, and means for partially eliminating the frictional contact between one of said reels and its member so that the other member will drive its reel.

6. The combination of a recording body, two reels upon which said body is adapted to be wound, two rotatable members arranged in substantially horizontal planes, means for simultaneously rotating both of said members and means for causing either one or the other of said reels to be driven from said members, whereby said body is unwound from one reel and wound upon the other.

7. The combination of a recording body, two reels upon which said body is adapted to be wound, two rotatable members, means for simultaneously rotating both of said members, means for causing either one or the other of said reels to be driven from said members, whereby said body is unwound from one reel and wound upon the other, and means whereby both of said members tend to rotate said reels in opposite directions for the purpose of bringing said reels to a state of rest.

8. The combination of a recording body, two reels upon which said body is arranged to be wound, braking means, driving means for rotating one of said reels, and means for permitting the other reel to frictionally engage said braking means when it is desired to stop said reels.

9. The combination of a recording body, two reels upon which said body is arranged to be wound, driving means for rotating one or the other of said reels and means driven by said driving means for braking the reel which is not driven.

10. The combination of two reels, two rotating members, means for simultaneously rotating said members, means whereby one or the other of said reels may be driven from one or the other of said members and means on each of said members acting to brake the reel thereon when it is not being driven.

11. The combination of two reels, a recording body arranged to be wound thereon, driving means for rotating one of said reels in one direction, and means for positively preventing said driving means from rotating in the opposite direction.

12. The combination of two reels, a recording body arranged to be wound thereon, driving means for rotating one of said reels in one direction, and means actuated by a backward movement of one of said reels for preventing said driving means from rotating in the opposite direction.

13. The combination of two reels, a recording body arranged to be wound thereon, a driving member for rotating one of said reels in one direction, a pawl for engagement with ratchet means on the driving member and means for throwing said pawl into engagement with the ratchet means responsive to a movement of the driving member in the opposite direction.

14. The combination of a recording body, two reels on which the recording body is arranged to be wound, two driving members for rotating said reels, means for simultaneously driving said members in opposite directions, means on each member acting to brake its spool when the other spool is being driven, and means for preventing said driving members from rotating except in one direction.

15. The combination of a recording body, two reels on which said body is arranged to be wound, means for driving one of said reels whereby the other reel is caused to follow, means for braking the following reel and locking means for preventing the driven reel from rotating in the opposite direction.

16. The combination of a recording body, two reels on which said body is arranged to be wound, means for driving one of said reels whereby the other reel is caused to follow, means for braking the following reel, and means for preventing the driven reel from rotating in the opposite direction, said braking means being arranged to tend to cause the following reel to rotate in the opposite direction.

17. The combination of a recording body, two reels on which said body is arranged to be wound, means for driving one of said reels whereby the other reel is caused to follow, means for braking the following reel, means for preventing the driven reel from rotating in the opposite direction, and means for so arranging said reels that the driven reel becomes the following reel and vice versa, said braking means being arranged to tend to cause the following reel to rotate in the opposite direction.

18. The combination of two rotating members mechanically connected, means for simultaneously rotating said members, means for preventing said members from rotating except in one direction, two reels each one of which is arranged so that it may be driven by one of said members, and means on each member arranged to brake its reel when its reel is not being driven thereby.

19. The combination of two rotating members mechanically connected, means for simultaneously rotating said members, means for preventing said members from rotating except in one direction, two reels each one of which is arranged so that it may be driven by one of said members, means for causing either one or the other of said reels to be driven by its corresponding rotating member, and means on each member arranged to brake its reel when its reel is not being driven thereby.

20. The combination of two rotatable members, means for rotating both of said members simultaneously, two reels arranged to rest upon said members when they are not in motion, so that they frictionally engage said members by the action of gravity, and means for raising one of said reels away from its member so that the other member will drive the other reel.

21. The combination of two members arranged to rotate simultaneously, two reels frictionally engaging said members, means for disengaging one of the reels from its member when it is desired to drive the other reel and to disengage said last mentioned reel when it is desired to drive said first mentioned reel, and means for rotating both of said members upon the disengagement of either of said reels.

22. The combination of two members arranged to rotate simultaneously, two reels frictionally engaging said members, and means for disengaging one of the reels from its member when it is desired to drive the other reel and to disengage said last mentioned reel when it is desired to drive said first mentioned reel.

23. The combination of two reels, two friction clutches for rotating said reels, means for causing one of said clutches to be thrown into engagement with one of said reels, and means for causing the other of said clutches to act as a friction brake for the other reel.

24. The combination of a recording body, two reels, on one of which the body is arranged to be wound and from the other of which the body is arranged to be unwound, means for driving said first mentioned reel, and locking means and friction means for each reel for preventing the body from becoming slack between said reels.

25. The combination of two rotatable members, two reels arranged to engage the same, a motor arranged to rotate said members simultaneously, electromagnetic means for each of said reels to substantially disengage it from its rotatable member, and a switch member arranged to close two separate circuits whereby when moved in one direction the motor is energized and one of said electromagnetic means is operated to substantially disengage its reel, and when moved in another direction the motor is energized and the other of said electromagnetic means is operated to substantially disengage the other reel from its rotatable member.

26. The combination of two rotatable members, two reels arranged to engage the same, a motor arranged to rotate said members simultaneously, electromagnetic means for each of said reels to substantially disengage it from its rotatable member, an electric circuit including the motor and one of said electromagnetic means, an electric circuit including the motor and the other electromagnetic means and switch apparatus for closing either one or the other of said circuits.

27. The combination of telegraphone apparatus, two electrical circuits controlling the same, and a foot lever arranged to close one circuit when moved in one direction and the other circuit when moved in another direction.

28. The combination of two rotatable members, two reels arranged to engage the same to be driven thereby, means for rotating said members simultaneously, and electromagnetic means for each of said reels to substantially disengage it from its rotatable member.

29. The combination of two reels upon which a recording body is arranged to be wound and unwound, means for driving one of said reels and electromagnetic means for disengaging said driven reel from said driving mechanism.

30. In a machine of the class described, a recording body, a talking head therefor and its magnetic devices, and a member pivoted to the talking head and arranged to hold the recording body in position with respect to said magnetic devices.

31. In a telegraphone, a recording body, a reel upon which said body is arranged to be wound, means for driving said reel and electromagnetic means for regulating the speed of said driving means.

32. In a telegraphone, a recording apparatus, a motor for driving the apparatus, and electromagnetic means for controlling the speed of said motor to maintain the same substantially constant.

33. In a telegraphone, recording apparatus, a series motor for driving the apparatus, circuit connections for controlling the supply of energy to the motor to control its speed and coils for controlling said circuit connections responsive to variations in the electrical condition of the motor to maintain its speed substantially constant.

34. The combination of a recording body, reels upon which said body may be wound, a talking head, mechanism for moving said head relatively to said reels to guide the body over the surfaces of the reels, and means for disengaging said mechanism with respect to the head whereby the head may be adjusted in any desired position prior to the operation of the reels.

35. The combination of a recording body, reels upon which said body may be wound, a talking head, mechanism for moving said head relatively to said reels to guide the body over the surfaces of the reels, said mechanism including a cam and follower and means whereby said cam may be turned to adjust the position of the head without movement of the rest of the mechanism.

36. In a machine of the class described, a recording body, a magnet for erasing records from said body by magnetizing the same, and a magnet for neutralizing the magnetization produced by said first magnet and remagnetizing said body responsive to sound vibrations, said last mentioned magnet being provided with a single coil which carries both the demagnetizing current and the current responsive to the sound vibrations.

37. In a machine of the class described, a recording body, and a magnet therefor having a coil carrying a single current composed of two components, one of which is adapted to bring the body to a neutral state and the other component of which is adapted to produce the record on the body.

38. In a machine of the class described, a recording body, an electric circuit for the same arranged to carry a single current composed of two components, one component of which is adapted to prepare the body for receiving a record and the other component of which is adapted to produce the record upon the body.

39. The combination of a recording body, a talking head, means for moving the talking head back and forth during the movement of the recording body, and means whereby said talking head may be adjusted to various positions to accommodate any position the recording body may be in when it is first put in place, said last mentioned means including a worm, and a gear removable from said worm and operated thereby.

40. The combination of a recording body, a talking head, means for moving the talking head back and forth during the movement of the recording body, and means whereby said talking head may be adjusted to various positions to accommodate any position the recording body may be in when it is first put in place, said last mentioned means including a member mechanically connected with said head and operating means therefor, said member and operating means being separable from one another.

In testimony whereof, I have signed my name to this specification, in the presence of two subscribing witnesses.

GEORGE S. TIFFANY.

Witnesses:
GORHAM CROSBY,
EDWIN SEGER.

It is hereby certified that in Letters Patent No. 1,142,384, granted June 8, 1915, upon the application of George S. Tiffany, of Summit, New Jersey, for an improvement in "Telegraphones," an error appears in the printed specification requiring correction as follows: Page 1, line 73, after the word "sectional" insert the word *side;* and that the said Letters Patent should be read with this correction therein that the same may conform to the record of the case in the Patent Office.

Signed and sealed this 29th day of June, A. D., 1915.

[SEAL.]

J. T. NEWTON,
*Acting Commissioner of Patents.*